3,184,318
PROCESS FOR THE PRODUCTION OF A GRANULAR CHEESE PRODUCT

Maurice B. McCadam, Van Nuys, Calif., assignor of fifty percent to Charles M. Cunningham, Reseda, Calif., and two and one-half percent to William H. Mahr, Los Angeles, Calif.
No Drawing. Filed Oct. 10, 1961, Ser. No. 144,026
20 Claims. (Cl. 99—115)

This invention relates to the processing of food products and has particular reference to a process for the production of granular cheese and the product thereof.

For many years attempts have been made to produce a packaged natural American cheddar cheese in granular form, but due to the inherent nature of such cheese and particularly its moisture content of approximately 38%, such results have been largely unsuccessful. At the present time the only commercially available granular or grated American cheese known to applicant is a cheese product which has been dehydrated to a moisture content of approximately 8%. This product has relatively poor appearance, it lacks the natural American cheddar cheese flavor and the melting qualities of the product are virtually destroyed by the dehydration treatment. A primary object of the present invention is, therefore, to provide a novel granular cheese product which is not subject to the above and other disadvantages of those heretofore proposed or used.

Another object of the present invention is to provide a novel process for the production of a packaged granular American cheddar cheese and other types of cheese having virtually the appearance, flavor and melting properties of freshly-grated cheese.

Other objects and advantages of the present invention, it is believed will be readily apparent from the following detailed description of a preferred embodiment thereof.

Briefly, the present invention comprehends within its scope the discovery that discrete particles of cheese can be preserved as such and packaged for sale by first freezing the cheese particles, thawing the particles and, during the thawing operation, applying an edible absorbent powder to the particles. It has been found that during the freezing, the natural moisture in the cheese (about 38% by weight for natural American cheddar cheese) crystallizes and expands, rupturing the natural cheese fats and solids in the cheese particles. As the temperature of the cheese particles rises above the freezing point, the free moisture and fat in the particles moves to the surface and upon contact therewith, the powder is quickly absorbed by this surface moisture and fat, the powder penetrating the cheese particles and drying the surface areas thereof, thus preventing adhesion of one particle to another.

In carrying out the process of the present invention, natural American cheddar cheese or other cheese such as Swiss cheese, Roquefort cheese, bleu cheese and the like, is reduced to granular or particle form, peferably by use of a grinding machine which reduces the cheese to the form of small, uniform pellets. The cheese pellets are then placed in a freezing room at a temperature of below 32° F., and maintained at such temperature until the pellets are completely frozen, producing the necessary crystallization and expansion of the moisture in the cheese. The frozen cheese pellets are then placed in an open rotating drum and allowed to rotate slowly with the drum heated to a temperature of between 85° and 100° F. This temperature is not particularly critical and higher or lower temperatures may be utilized if desired. However, the specific range set forth is the optimum temperature for the production of granular cheese adapted to be stored at normal room temperatures. If storage temperatures higher than about 100° F. are contemplated, correspondingly higher thawing or heating temperatures should be utilized, and if the product is to be stored under refrigeration, somewhat lower temperatures can be utilized in the blending operation.

As the temperature of the cheese pellets rises above about 32° F., thawing begins at the surface and the free moisture and fat in the cheese pellets moves to the surfaces of the pellets. This point is readily determined by visual observation of the pellets as they are rotated, and immediately at this point, an edible absorbent powder such as low moisture non-fat milk powder is slowly added to the pellets. Upon contact with the pellets, the dry powder is quickly absorbed by the surface moisture and fat on the pellets, penetrating into the pellets and drying the surface areas thereof. As the temperature of the cheese pellets rises, additional fat and moisture is continuously drawn to the surfaces of the pellets and is further absorbed by the addition of more powder. The addition of powder and rotation of the pellets during the heating operation is continued until all of the pellets have reached the desired temperature and further absorption of the powder stops. The absorption of the dry powder in each pellet creates a low moisture protective area surrounding the center core of each pellet, reducing the moisture content of the surface area to a point where mold growth is discouraged and where the pellets have no tendency to stick or agglomerate together, yet not appreciably affecting the natural flavor and melting qualities of the original cheese.

While non-fat milk powder is the preferred material used in carrying out the process of this invention, other edible, low-moisture absorbent powders can be utilized, for example, whey powder, wheat or other grain flour, starch and the like. Additionally, admixtures of such powders are contemplated within the scope of the present invention, and flavoring powders such as garlic powder, barbecue powder, seasonings and the like can be added if desired. The amount of absorbent powder used may vary within reasonable limits, depending mainly upon the specific type of cheese, type of powder and processing or heating temperature utilized. Sufficient powder should be utilized to absorb the moisture released during the heating operation and to provide a moisture content in the surface areas of the particles sufficiently low to prevent appreciable adherence of one particle to another during the heating step, as well as during storage at the desired storage conditions. Amounts of powder in excess of such sufficient amounts are not especially harmful, but add nothing to the quality of the product and are preferably avoided, particularly in the case of white-appearing powders such as milk powder, which would affect the appearance of the finished product unless colored substantially the same shade as the natural cheese. Having in mind that products within the scope of the present invention can be produced for storage at room temperature or under refrigerated conditions, that the various powders differ in absorbing power, and that the various cheeses have differing moisture contents and freezing-thawing characteristics, the amount of added powder can be varied from as low as 5%, or even less, to as high as 50% or more, based upon the weight of the cheese.

The following specific examples are illustrative of the process and product of the present invention, but it is to be understood that the invention is not to be limited to the specific details thereof:

Example 1

1,000 pounds of fresh natural American cheddar cheese was reduced to pellets approximately ¼ inch in maximum dimension and ¹⁄₁₆ inch in minimum dimension in a grinding machine, and the pellets were then placed in trays and frozen at a temperature of minus 10° F. The frozen cheese pellets were then placed in an open rotating drum and rotated slowly at a temperature of about 90° F. until the temperature of the pellets rose above freezing (32° F.), and immediately at this point, non-fat milk powder containing approximately 3% moisture, was slowly added to the pellets. The heating and addition of the powder was continued until the entire mass of pellets had reached the temperature of about 90° F., at which point 250 pounds of powder had been added to the pellets. The treated pellets were removed from the drum and packaged in transparent cellophane bags for room temperature storage and use.

*Example 2*

This example was the same as Example 1, except that 500 pounds of whey powder was used in place of the milk powder of Example 1.

Having fully described my invention, it is to be understood that I do not wish to be limited to the details set forth, but my invention is of the full scope of the appended claims.

I claim:

1. A process for the production of a granular cheese product, comprising the steps of separating a bulk of natural cheese into discrete particles generally of the size of granular cheese particles, freezing the cheese particles, thawing said particles, and immediately upon surface thawing of said particles and during said thawing step, adding to said particles a moisture-absorbing amount of an edible powder.

2. A process for the production of a granular cheese product, comprising the steps of separating a bulk of natural cheese into discrete particles generally of the size of granular cheese particles, freezing the cheese particles, thawing said particles, and immediately upon surface thawing of said particles and during said thawing step, adding to said particles a moisture-absorbing amount of milk powder.

3. A process for the production of a granular cheese product, comprising the steps of separating a bulk of natural cheese into discrete particles generally of the size of granular cheese particles, freezing the cheese particles, thawing said particles, and immediately upon surface thawing of said particles and during said thawing step, adding to said particles a moisture-absorbing amount of whey powder.

4. A process for the production of a granular cheese product, comprising the steps of separating a bulk of natural cheese into discrete particles generally of the size of granular cheese particles, freezing the cheese particles, thawing said particles to a temperature in the range 85°–100° F., and immediately upon surface thawing of said particles and during said thawing step, adding to said particles a moisture-absorbing amount of an edible powder.

5. A process for the production of a granular cheese product, comprising the steps of separating a bulk of natural cheese into discrete particles generally of the size of granular cheese particles, freezing the cheese particles, thawing said particles to a temperature in the range 85°–100° F., and immediately upon surface thawing of said particles and during said thawing step, adding to said particles a moisture-absorbing amount of milk powder.

6. A process for the production of a granular cheese product, comprising the steps of separating a bulk of natural cheese into discrete particles generally of the size of granular cheese particles, freezing the cheese particles, thawing said particles to a temperature in the range 85°–100° F., and immediately upon surface thawing of said particles and during said thawing step, adding to said particles a moisture-absorbing amount of whey powder.

7. A process for the production of a granular cheese product, comprising the steps of separating a bulk of natural cheese into discrete particles generally of the size of granular cheese particles, freezing the cheese particles, thawing said particles, and immediately upon surface thawing of said particles and during said thawing step, adding to said particles a moisture-absorbing amount of milk powder, said amount comprising approximately 25% by weight, based on the weight of the cheese.

8. A process for the production of a granular cheese product, comprising the steps of separating a bulk of natural cheese into discrete particles generally of the size of granular cheese particles, freezing the cheese particles, thawing said particles, and immediately upon surface thawing of said particles and during said thawing step, adding to said particles a moisture-absorbing amount of whey powder, said amount comprising approximately 50% by weight, based on the weight of the cheese.

9. A process for the production of a granular cheese product, comprising the steps of separating a bulk of natural cheese into discrete particles generally of the size of granular cheese particles, freezing the cheese particles, thawing said particles to a temperature in the range 85°–100° F., and immediately upon surface thawing of said particles and during said thawing step, adding to said particles a moisture-absorbing amount of milk powder, said amount comprising approximately 25% by weight, based on the weight of the cheese.

10. A process for the production of a granular cheese product, comprising the steps of separating a bulk of natural cheese into discrete particles generally of the size of granular cheese particles, freezing the cheese particles, thawing said particles to a temperature in the range 85°–100° F., and immediately upon surface thawing of said particles and during said thawing step, adding to said particles a moisture-absorbing amount of whey powder, said amount comprising approximately 50% by weight, based on the weight of the cheese.

11. The process of claim 1 wherein the cheese is natural American cheddar cheese.

12. The process of claim 2 wherein the cheese is natural American cheddar cheese.

13. The process of claim 3 wherein the cheese is natural American cheddar cheese.

14. The process of claim 4 wherein the cheese is natural American cheddar cheese.

15. The process of claim 5 wherein the cheese is natural American cheddar cheese.

16. The process of claim 6 wherein the cheese is natural American cheddar cheese.

17. The process of claim 7 wherein the cheese is natural American cheddar cheese.

18. The process of claim 8 wherein the cheese is natural American cheddar cheese.

19. The process of claim 9 wherein the cheese is natural American cheddar cheese.

20. The process of claim 10 wherein the cheese is natural American cheddar cheese.

References Cited by the Examiner

UNITED STATES PATENTS

| | | | |
|---|---|---|---|
| 1,737,770 | 12/29 | Parsons | 99—117 |
| 2,446,550 | 8/48 | North | 99—116 |
| 2,576,597 | 11/51 | Gootgeld | 99—115 |
| 2,789,909 | 4/57 | Flosdorf et al. | 99—115 |

A. LOUIS MONACELL, *Primary Examiner.*

ABRAHAM H. WINKELSTEIN, *Examiner.*